(12) United States Patent
Sato

(10) Patent No.: US 10,549,705 B2
(45) Date of Patent: Feb. 4, 2020

(54) SWITCH DEVICE FOR ON-BOARD POWER SUPPLY AND ON-BOARD POWER SUPPLY DEVICE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Shinichiro Sato, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 0 days.

(21) Appl. No.: 15/780,866

(22) PCT Filed: Feb. 3, 2017

(86) PCT No.: PCT/JP2017/003933
§ 371 (c)(1),
(2) Date: Jun. 1, 2018

(87) PCT Pub. No.: WO2017/138448
PCT Pub. Date: Aug. 17, 2017

(65) Prior Publication Data
US 2018/0370465 A1 Dec. 27, 2018

(30) Foreign Application Priority Data
Feb. 10, 2016 (JP) .................................. 2016-023348

(51) Int. Cl.
*B60R 16/033* (2006.01)
*H02J 1/00* (2006.01)
(Continued)

(52) U.S. Cl.
CPC ............. *B60R 16/033* (2013.01); *H02H 7/18* (2013.01); *H02J 1/00* (2013.01); *H02J 7/1423* (2013.01);
(Continued)

(58) Field of Classification Search
CPC ......... B60R 16/033; H02H 3/16; H02H 7/18; H02J 1/00; H02J 7/00; H02J 7/1423; H02J 2007/0095
(Continued)

(56) References Cited

U.S. PATENT DOCUMENTS

2012/0068546 A1 3/2012 Kuramochi et al.
2013/0082639 A1 4/2013 O'Kane et al.
2015/0239366 A1 8/2015 Jestin et al.

OTHER PUBLICATIONS

Search Report for PCT/JP2017/003933, dated Mar. 14, 2017.

*Primary Examiner* — Hal Kaplan
(74) *Attorney, Agent, or Firm* — Honigman LLP

(57) ABSTRACT

A relay module includes: power supply lines; main relay; sub relay with different current capacities. The first power supply line is connected to a main battery, the second power supply line is connected to a sub battery, and the third power supply line is connected to a load. The main relay is between the first and third power supply lines. The sub relay is between the second and third power supply lines. The main relay disconnects when a ground fault occurs in the first power supply line, and connects when a ground fault occurs in the second power supply line. The sub relay disconnects with a ground fault in the second power supply line, and connects with a ground fault in the first power supply line. Whichever one of the main relay and the sub relay has a larger current capacity becomes electrically connected, and the other becomes electrically disconnected.

17 Claims, 8 Drawing Sheets

(51) Int. Cl.
  *H02H 7/18* (2006.01)
  *H02H 3/16* (2006.01)
  *H02J 7/00* (2006.01)
  *H02J 7/14* (2006.01)

(52) U.S. Cl.
  CPC ........ *H02H 3/16* (2013.01); *H02J 2007/0095* (2013.01)

(58) Field of Classification Search
  USPC .......................................................... 307/80
  See application file for complete search history.

SWITCH DEVICE FOR ON-BOARD POWER SUPPLY AND ON-BOARD POWER SUPPLY DEVICE

CROSS-REFERENCE TO RELATED APPLICATIONS

This application is the U.S. national stage of PCT/JP2017/003933 filed Feb. 3, 2017, which claims priority of Japanese Patent Application No. 2016-023348 filed on Feb. 10, 2016, which is incorporated herein by reference in its entirety.

FIELD OF THE INVENTION

The present description relates to a switch device and a power supply device, and particularly to a switch device for an on-board power supply and an on-board power supply device that are connected to a plurality of on-board power storage devices and loads so as to be interposed therebetween.

BACKGROUND OF THE INVENTION

FIG. 9 is a block diagram showing an example of a conventional configuration of an on-board power supply system. Such a configuration is well-known from, for example, JP 9-233694A.

A fuse box 70 includes fuses 71 to 74. Proximal ends of these fuses are each connected to a power supply line 61 at points inside the fuse box 70.

Distal ends of the fuses 71 to 74 are respectively connected to a general load 81, a general load 82, an important load 85, and a general load 86 at points outside the fuse box 70.

The power supply line 61, a starter 3 (denoted as "ST" in the figure), and an alternator 4 (denoted as "ALT" in the figure) are connected to a main battery 1 via individual fuses included in the fuse set 11.

The fuse set 11 is realized using, for example, a battery fuse terminal (hereinafter abbreviated to "BFT").

The configuration shown in FIG. 9 lacks redundancy regarding the supply of power (hereinafter referred to as "power supply"). Specifically, if a voltage drop occurs due to a decrease in the current capacity of the main battery 1, for example, or if an open-circuit failure occurs due to the power supply line 61 and the fuse set 11 being disconnected from each other, for example, there is a problem in which all of the loads connected to the fuse box 70 are not supplied with power.

For example, when compared with the general load 86, the important load 85 has functional units that are desirable for vehicle security, such as actuators for steering and braking. It is desirable that power is supplied to the important load 85 even when power is not supplied to the general load 81, 82, or 86.

Therefore, it has been proposed to improve redundancy regarding power supply by providing a plurality of power supply paths to the important load 85. Such technology is well-known from JP 2015-83404A, for example.

SUMMARY OF THE INVENTION

If a plurality of power supply paths are simply connected to the power supply line 61 in the same manner, it is possible to maintain power supply to the loads even when an open-circuit failure occurs. However, if a ground fault occurs in one path, or a voltage drop occurs in a battery that supplies power to one path, such a problem also has an influence on other paths via the power supply line 61. As a result, there is the possibility of being unable to maintain power supply to the loads.

Therefore, the first objective of the present description is to provide technology for maintaining power supply to a load even when a ground fault occurs in one path.

Furthermore, the second objective is to reduce the volume and costs that are required to form a configuration for achieving the first objective.

Furthermore, the third objective is to provide technology for maintaining power supply to a load even when a voltage drop occurs in a battery that serves as a power supply source for one path.

An on-board power supply switch device according to a first aspect is an on-board power supply switch device that is to be interposed between: a set of a first power storage device and a second power storage device that are both mounted on a vehicle; and a load that is mounted on the vehicle and that can operate using power supplied from whichever of the first power storage device or the second power storage device, the on-board power supply switch device including: a first power supply line that is to be connected to the first power storage device; a second power supply line that is to be connected to the second power storage device; a third power supply line that is to be connected to the load; a first switch that is provided between the first power supply line and the third power supply line; and a second switch that is provided between the second power supply line and the third power supply line, and is different from the first switch in current capacity. When it is determined that an abnormality has occurred in the first power supply line, the first switch becomes electrically disconnected, and when it is determined that an abnormality has occurred in the second power supply line, the first switch becomes electrically connected. When it is determined that an abnormality has occurred in the second power supply line, the second switch becomes electrically disconnected, and when it is determined that an abnormality has occurred in the first power supply line, the second switch becomes electrically connected. When it is determined that no abnormality has occurred in either the first power supply line or the second power supply line, whichever one of the first switch and the second switch has a larger current capacity becomes electrically connected, and the other becomes electrically disconnected.

An on-board power supply switch device according to a second aspect is that according to the first aspect, wherein a current capacity of the second switch is larger than a current capacity of the first switch, and when it is determined that a ground fault has occurred in the second power supply line, the first switch becomes electrically connected after the second switch has become electrically disconnected.

An on-board power supply switch device according to a third aspect is that according to the first aspect, wherein a current capacity of the second switch is smaller than a current capacity of the first switch, and when it is determined that a ground fault has occurred in the first power supply line, the second switch becomes electrically connected after the first switch has become electrically disconnected.

An on-board power supply switch device according to a fourth aspect is that according to the first aspect, wherein a current capacity of the second switch is larger than a current capacity of the first switch, and when it is determined that a voltage drop has occurred in the second power supply line, the second switch becomes electrically disconnected after the first switch has become electrically connected.

An on-board power supply switch device according to a fifth aspect is that according to the fourth aspect, wherein, when it is determined that a voltage drop in the second power supply line has been resolved, the first switch becomes electrically disconnected after the second switch has become electrically connected.

An on-board power supply switch device according to a sixth aspect is that according to the first aspect, wherein a current capacity of the second switch is smaller than a current capacity of the first switch, and when it is determined that a voltage drop has occurred in the first power supply line, the first switch becomes electrically disconnected after the second switch has become electrically connected.

An on-board power supply switch device according to a seventh aspect is that according to the sixth aspect, wherein, when it is determined that a voltage drop in the first power supply line has been resolved, the second switch becomes electrically disconnected after the first switch has become electrically connected.

An on-board power supply switch device according to an eighth aspect is that according to the first aspect, further including: a third switch that is connected between the first power supply line and the second power supply line. When it is determined that a ground fault has occurred in either the first power supply line or the second power supply line, the third switch becomes electrically disconnected, and when it is determined that a voltage drop has occurred in either the first power supply line or the second power supply line, the third switch becomes electrically connected.

An on-board power supply switch device according to a ninth aspect is that according to the eighth aspect, wherein a current capacity of the second switch is larger than a current capacity of the first switch, and when it is determined that a ground fault has occurred in the second power supply line, the second switch becomes electrically disconnected after the third switch has become electrically disconnected, and the first switch becomes electrically connected after the second switch has become electrically disconnected.

An on-board power supply switch device according to a tenth aspect is that according to the eighth aspect, wherein a current capacity of the second switch is smaller than a current capacity of the first switch, and when it is determined that a ground fault has occurred in the first power supply line, the first switch becomes electrically disconnected after the third switch has become electrically disconnected, and the second switch becomes electrically connected after the first switch has become electrically disconnected.

An on-board power supply switch device according to an eleventh aspect is that according to any one of the first to tenth aspects, further including a control circuit. The load operates in either a first mode, or a second mode in which power consumption is lower than that in the first mode. When it is determined that an abnormality has occurred in either the first power supply line or the second power supply line, the control circuit causes the load to operate in the second mode.

An on-board power supply switch device according to a twelfth aspect is that according to the eleventh aspect, wherein, when it is determined that a voltage drop has been resolved in both the first power supply line and the second power supply line, the control circuit causes the load to operate in the first mode.

A power supply device according to a thirteenth aspect is an on-board power supply device including: the on-board power supply switch device according to any one of the first to tenth aspects; the first power storage device; and the second power storage device.

With the on-board power supply switch device according to the first aspect, the first power storage device and the second power storage device are respectively connected to the first power supply line and the second power supply line, and a load that requires redundant power supply is connected to the third power supply line. Therefore, even if an abnormality occurs in only one of the first power supply line and the second power supply line, it is possible to maintain power supply from the third power supply line to the load, even though the magnitude of the current that can be fed is small in some cases.

Also, the current capacity of one of the first switch and the second switch is smaller than the current capacity of the other. Therefore, it is possible to reduce the volume and costs that are required to form an on-board power supply switch device.

With the on-board power supply switch device according to the second aspect, it is possible to swiftly block an excess current flowing from the second power supply line in which a ground fault has occurred.

With the on-board power supply switch device according to the third aspect, it is possible to swiftly block an excess current flowing from the first power supply line in which a ground fault has occurred.

With the on-board power supply switch device according to the fourth or sixth aspect, it is possible to reduce the period of a voltage drop in the power supply to the load connected to the third power supply line.

With the on-board power supply switch device according to the fifth or seventh aspect, it is possible to maintain power supply to the load.

With the on-board power supply switch device according to the eighth aspect, even if a ground fault occurs in one of the first power supply line and the second power supply line, it is possible to block the influence thereof on the other. Even if a voltage drop occurs in one of the first power supply line and the second power supply line, no voltage drop occurs regarding power supply to the load connected to the third power supply line. Thus, it is possible to maintain power supply to the load.

With the on-board power supply switch device according to the ninth aspect, it is possible to swiftly block an excess current flowing from the second power supply line in which a ground fault has occurred.

With the on-board power supply switch device according to the tenth aspect, it is possible to swiftly block an excess current flowing from the first power supply line in which a ground fault has occurred.

With the on-board power supply switch device according to the eleventh aspect, even if a ground fault or a voltage drop occurs in one of the first power supply line and the second power supply line, the power consumption of the load when the load operates is low, and therefore, power supply via whichever of the first switch or the second switch has a smaller current capacity is sufficient to enable the load to operate.

With the on-board power supply switch device according to the twelfth aspect, if no abnormality has occurred in either the first power supply line or the second power supply line, it is possible to allow the load to operate in the first mode to increase the processing capabilities of the load.

DETAILED DESCRIPTION OF THE PREFERRED EMBODIMENTS

Basic Configurations

Figure 1:
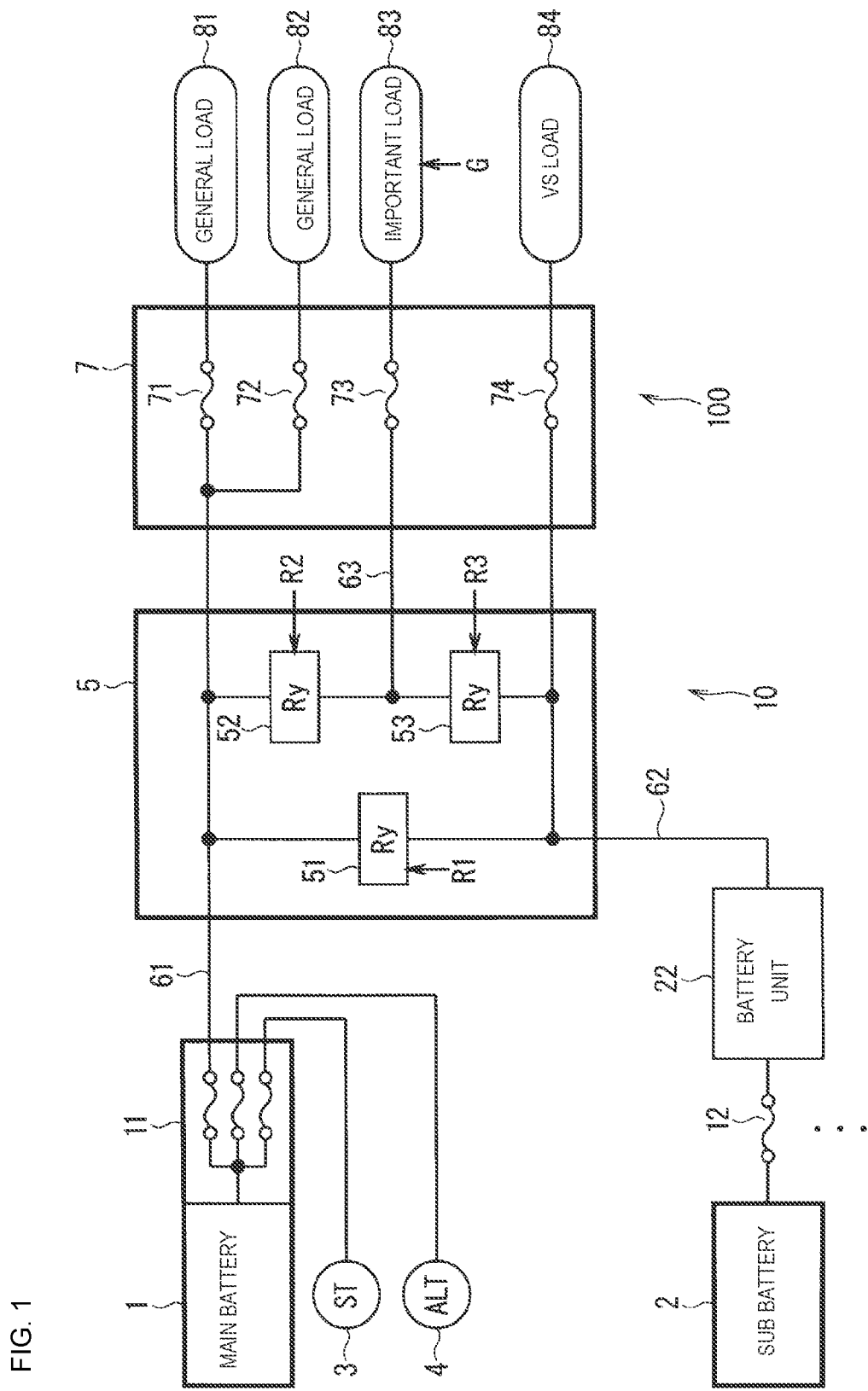
FIG. 1 is a block diagram showing an example of a configuration of a power supply system according to a first embodiment and a second embodiment.

FIG. 1 is a block diagram showing an example of an on-board power supply system 100 according to a first embodiment and a second embodiment. The power supply system 100 is provided with a power supply device 10 that includes a main battery 1, a sub battery 2, and a relay module 5, and loads 81 to 84. Power is supplied from the relay module 5 to the loads 81 to 84 via a fuse box 7. The power supply system 100 may be construed as a system that additionally includes the fuse box 7. All of these components are mounted on a vehicle.

The load 83 is a load that requires redundant power supply, and is hereinafter referred to as "the important load 83". The important load 83 is, for example, a load related to vehicle travel control. The important load 83 operates upon being supplied with power, regardless of whether the power is supplied from the main battery 1 or the sub battery 2.

The loads 81 and 82 are general loads, and are hereinafter referred to as "the general loads 81 and 82". The general loads 81 and 82 are, for example, an audio device and an in-vehicle lamp. The priority of these loads is lower than that of the important load 83, regarding power supply when a power supply failure has occurred.

The load 84 is a load that is desired to have high voltage stability, and is hereinafter referred to as "the VS (Voltage-stabilized) load 84". The voltage stability mentioned above means that, for example, a voltage that is supplied to the VS load is unlikely to fall below the operable lower limit value for the VS load. A more specific example is a voltage that is unlikely to cause a momentary power interruption. The VS load is, for example, a control circuit (e.g. a microcomputer) that controls actuators that are mounted on the vehicle.

The load 83 operates either in a normal mode (hereinafter also referred to as "the first mode"), in which the load 83 consumes a normal amount of power to operate, or in a low power consumption mode (hereinafter also referred to as "the second mode"), in which the load 83 consumes a smaller amount of power than in the normal mode. The second mode may include a plurality of modes in any of which power consumption is lower than that in the first mode, and in which power consumption is different from one another. The important load 83 operates in the first mode when an abnormality notification G is not transmitted, and operates in the second mode when the abnormality notification G is transmitted.

The relay module 5 is provided with power supply lines 61, 62, and 63, and switches 51, 52, and 53. For example, these components are realized using relays. Therefore, these components are hereinafter referred to as a separation relay 51, a main relay 52, and a sub relay 53. Turning ON/OFF a switch is equivalent to closing/opening a relay.

The separation relay 51 is not necessarily provided, and such a case is described in the first embodiment. A case in which the separation relay 51 is provided is described in the second embodiment. The main relay 52 is provided between the power supply line 61 and the power supply line 63, and the sub relay 53 is provided between the power supply line 62 and the power supply line 63.

The main battery 1 is connected to the power supply line 61, and the sub battery 2 is connected to the power supply line 62. Specifically, the power supply line 61 is connected to the main battery 1 via one fuse included in the fuse set 11. Note that a starter 3 and an alternator 4 are connected to the main battery 1 respectively via other fuses included in the fuse set 11. The fuse set 11 is realized using a BFT, for example.

The main battery 1 serves as a drive power supply for the starter 3, which starts up an engine (not shown), and is charged using the power generation function of the alternator 4. To realize the power generation function, a side mounted starter generator (SSG) may be used instead of the alternator 4. As the main battery 1, a lead storage battery is employed, for example. As the sub battery 2, a lithium ion battery, a nickel-hydrogen battery, or an electric double-layer capacitor is employed, for example. All of these components can be construed as storage batteries.

The sub battery 2 is connected to the power supply line 62 via a fuse 12 and a battery unit 22. The battery unit 22 is a relay module or a DC/DC converter, for example. Considering the fact that high voltage stability is required when supplying power to the VS load 84, it is desirable that the battery unit 22 is a DC/DC converter. This is because, even if the voltage fluctuates in the sub battery 2, a desired voltage can be obtained from the battery unit 22 realized using a DC/DC converter.

Also, if the DC/DC converter is a bidirectional DC/DC converter, it is possible to charge the sub battery 2 from the power supply line 61 via the separation relay 51, the main relay 52, and the sub relay 53 that are in an ON state. Descriptions of such operations performed by the separation relay 51, the main relay 52, and the sub relay 53 to charge the sub battery 2 are omitted.

The separation relay 51, the main relay 52, and the sub relay 53 are closed (ON: electrically connected) or opened (OFF: electrically disconnected) in response to control signals R1, R2, and R3, respectively.

The general loads 81 and 82 are connected to the power supply line 61 via fuses 71 and 72, respectively. The fuses 71 and 72 and the power supply line 61 may collectively be construed as a single power supply line. The important load 83 is connected to the power supply line 63 via a fuse 73. The fuse 73 and the power supply line 63 may collectively be construed as a single power supply line. The VS load 84 is connected to the power supply line 62 via a fuse 74. The fuse 74 and the power supply line 62 may collectively be construed as a single power supply line.

Portions of the power supply lines 61, 62, and 63 outside the relay module 5 and the fuse box 7 are realized using, for example, a bundle of wires, which is referred to as "wire harness".

Figure 2:
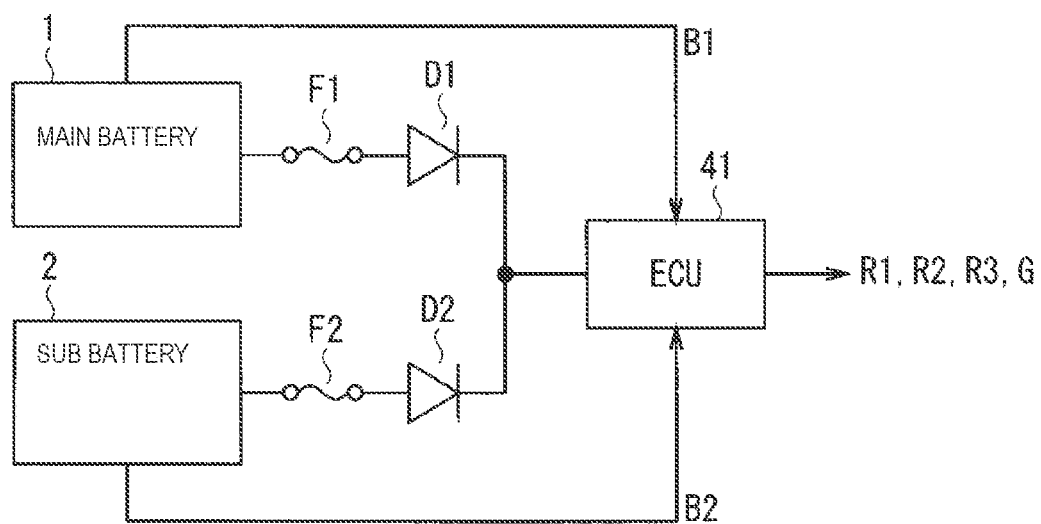
FIG. 2 is a block diagram showing an example of a configuration for controlling opening/closing of a separation relay, a main relay, and a sub relay.

FIG. 2 is a block diagram showing an example of a configuration for controlling the opening/closing (also expressed as "ON/OFF" and "electrically connected/electrically disconnected") of the separation relay 51, the main relay 52, and the sub relay 53. An ECU (Electronic Control Unit) 41 acquires a signal B1 that indicates the status of the main battery 1, and a signal B2 that indicates the status of the sub battery 2, from the main battery 1 and the sub battery 2, respectively. As described in the embodiments below, the ECU 41 outputs the control signals R1, R2, and R3 and the abnormality notification G in response to the signals B1 and B2.

The ECU 41 is supplied with power from the main battery 1 and the sub battery 2. In this example, the ECU 41 is provided with diodes D1 and D2 for power supply, and the forward direction of each diode is the direction in which a current flows when the ECU 41 is supplied with power. Usually, the body of the vehicle is set at a low potential (grounded). Therefore, the cathodes of the diodes D1 and D2 are both connected to the power receiving terminal of the ECU 41, the anode of the diode D1 is connected to the main battery 1, and the anode of the diode D2 is connected to the sub battery 2. The ECU 41 can be realized using a body control module (BCM), for example.

The ECU 41 includes a microcomputer and a storage device, for example. The microcomputer executes processing steps (in other words, procedures) that are described in a program. The aforementioned storage device can be constituted by one or more storage devices selected from various kinds of storage devices such as a ROM (Read Only Memory), a RAM (Random Access Memory), a rewritable non-volatile memory (e.g. an EPROM (Erasable Programmable ROM)), and a hard disk device. The storage device stores various kinds of information, data, and so on, and stores a program that is to be executed by the microcomputer, and also provides a work area in which a program can be executed. Note that the microcomputer can be construed as a component that serves as various means corresponding to processing steps that are described in a program, and can also be construed as a component that realizes various functions corresponding to the processing steps. The ECU 41 is not limited to the description above, and part or all of various procedures that are executed by the ECU 41, or various means or various functions that are realized by the ECU 41, may be realized using a hardware circuit. The same applies to other control circuits below.

A fuse F1 is provided between the main battery 1 and the anode of the diode D1. The fuse F1 is provided in the fuse set 11, for example. A fuse F2 is provided between the sub battery 2 and the anode of the diode D2. The fuse F2 is realized together with the fuse 12, using a BFT, for example.

The relay module 5 includes the separation relay 51, the main relay 52, and the sub relay 53 that are used to realize switches, and can be regarded as an on-board power supply switch device.

Figure 3:
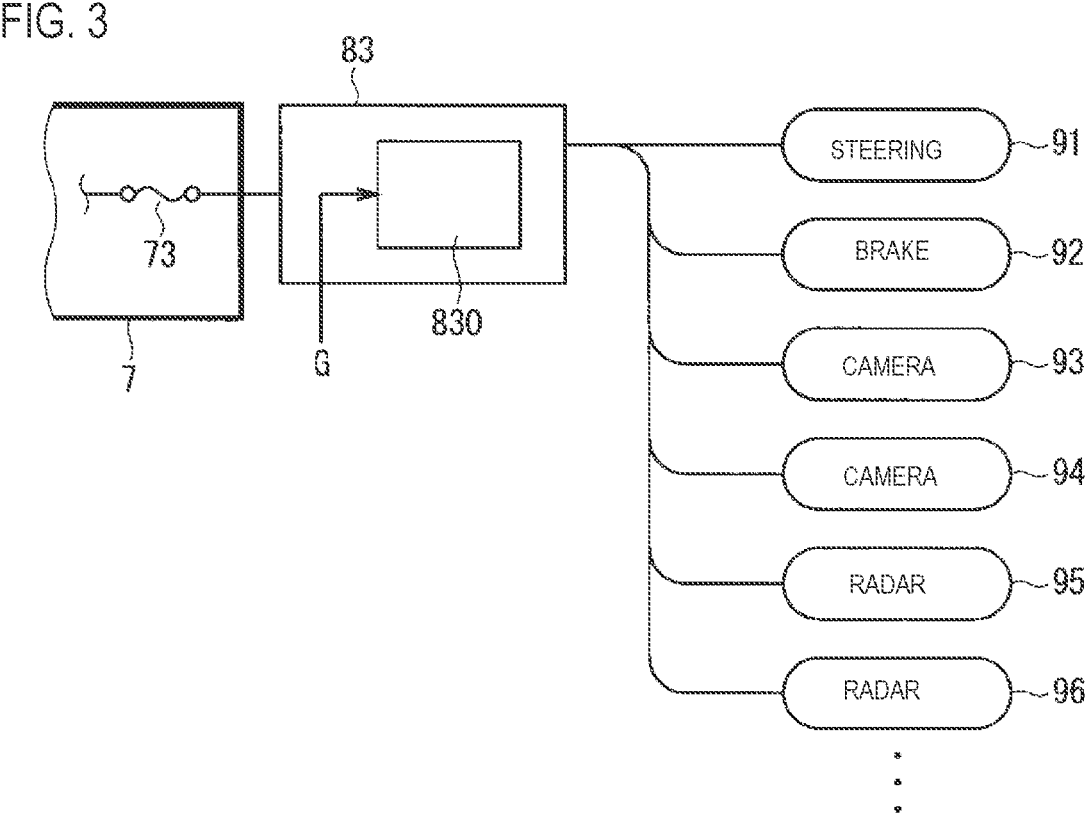
FIG. 3 is a block diagram showing an important load, and a relationship between the important load and actuators in the vicinity thereof.

FIG. 3 is a block diagram showing the important load 83, and a relationship between the important load 83 and actuators in the vicinity thereof. The important load 83 is realized using an ECU, for example. The important load 83 controls operations of a steering actuator 91 (simply denoted as "STEERING" in the figure), a brake actuator 92 (simply denoted as "BRAKE" in the figure), cameras 93 and 94, and radars 95 and 96, and transmits/receives signals thereto/therefrom. The important load 83 may also control operations of other actuators and sensors, and transmit/receive signals thereto/therefrom.

As shown in FIG. 1, the important load 83 is supplied with power from the fuse 73 provided in the fuse box 7. The important load 83 includes a microcomputer 830, and operates in the first mode or the second mode depending on whether or not the abnormality notification G has been input thereto.

For example, in the first mode, the important load 83 controls operations of the steering actuator 91, the brake actuator 92, the cameras 93 and 94, and the radars 95 and 96, and transmits/receives signals thereto/therefrom. In the second mode, the important load 83 controls operations of the steering actuator 91, the brake actuator 92, the camera 93, and the radar 95, and transmits/receives signals thereto/therefrom, but does not control operations of the camera 94 and the radar 96, and does not transmit/receive signals thereto/therefrom. Alternatively, in the second mode, the important load 83 lowers the processing speed thereof compared to the processing speed in the first mode. Thus, power consumption of operations in the second mode is lower than power consumption of operations in the first mode.

However, from the viewpoint of vehicle travel control, it is desirable that the important load 83, when even in the second mode, controls operations of the steering actuator 91 and the brake actuator 92, and transmits/receives signals thereto/therefrom. Therefore, as described above, it is desirable that the important load 83 is supplied with power even when other loads are not supplied with power.

It is possible to switch the operation mode of the important load 83 to the first mode and the second mode based on the abnormality notification G, without providing the microcomputer 830. Alternatively, it is possible to switch the operation mode of the important load 83 to the first mode and the second mode upon the microcomputer 830 receiving the signals B1 and B2, without using the ECU 41.

Note that, in the following descriptions of the embodiments, constituent elements that are the same as those described above are assigned the same reference numerals, and descriptions thereof are omitted.

First Embodiment

As described above, the present embodiment describes a case in which the separation relay 51 is not provided. Accordingly, the control signal R1 is not employed.

Figure 4:
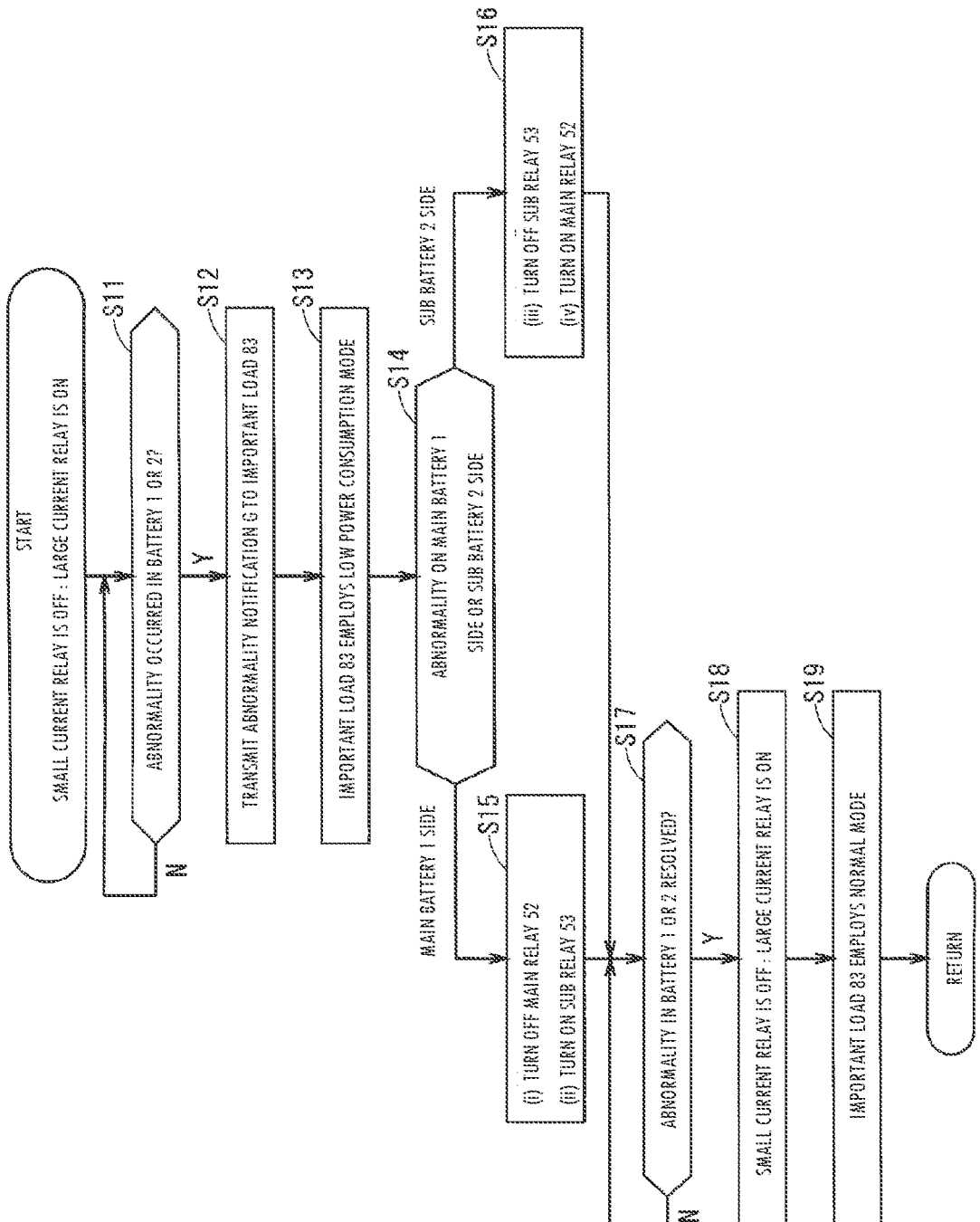
FIG. 4 is a flowchart showing operations of the power supply system according to the first embodiment.

FIG. 4 is a flowchart showing operations of the power supply system 100 according to the first embodiment. First, when it is determined that there is no abnormality at the starting point, i.e., when default settings are employed, whichever one of the main relay 52 and the sub relay 53 has a larger current capacity (hereinafter referred to as "large current relay": the same applies to the figures) is ON, and the other relay that has a smaller current capacity (hereinafter referred to as "small current relay": the same applies to the figures) is OFF. Thus, power supply to the important load 83 has a current of a certain magnitude that is sufficient to enable the important load 83 to operate in the first mode. Therefore, in the following description, it is assumed that the important load 83 operates in the first mode at the starting point.

Note that, for example, the dimensions of the large current relay in plan view is several hundreds of (e.g. approximately 200) millimeters×several hundreds of (e.g. approximately 300) millimeters, and the dimensions of the small current relay in plan view is several tens of (e.g. approximately 20) millimeters×several tens of (e.g. approximately 20) millimeters. Usually, the large current relay costs more than, for example approximately 100 times as much as, the small current relay.

In step S11, the ECU 41 determines whether or not an abnormality has occurred in the main battery 1 or the sub battery 2 (expressed as "IN BATTERY 1 OR 2" in the figure). Such determination can be performed based on the signals B1 and B2. If neither the signal B1 nor B2 indicates the occurrence of an abnormality, the ECU 41 determines that no abnormality has occurred, and step S11 is repeated. If either the signal B1 or B2 indicates the occurrence of an abnormality, the ECU 41 determines that an abnormality has occurred, and step S12 is executed.

In step S12, the ECU 41 transmits the abnormality notification G to the important load 83. In response, the important load 83 employs the low power consumption mode in step S13.

Upon step S12 being executed, the ECU 41 executes step S14. As described above, step S13 is executed by the important load 83. Therefore, it is unnecessary to wait for execution of step S13 before executing step S14. However, it is desirable that step S13 is executed prior to steps S15 and S16, which are executed after step S14.

In step S14, the ECU 41 determines whether the abnormality determined to have occurred in step S11 is an abnormality that occurred on the main battery 1 side (with respect to the main relay 52 (the same applies to the following description)) or on the sub battery 2 side (with respect to the sub relay 53 (the same applies to the following description)). Examples of the abnormality include both a voltage drop and a ground fault.

A voltage drop on the main battery 1 side is detected using the signal B1, and a voltage drop on the sub battery 2 side is detected using the signal B2. For example, if a ground fault has occurred in the power supply line 61, the ground fault is detected using the signal B1, as the occurrence of a large voltage drop or excess current on the main battery 1 side, and if a ground fault has occurred in the power supply line 62, the ground fault is detected using the signal B2, as the occurrence of a large voltage drop or excess current on the sub battery 2 side.

More practically, the determination performed in step S14 can be performed in step S11. Therefore, it can be said that step S14 is a step that is executed to determine what step is to be subsequently executed, based on the result of determination in step S14.

If the abnormality is an abnormality that occurred on the main battery 1 side, processing in step S15 is executed. Specifically, the ECU 41 controls the control signals R2 and R3 to execute processing to (i) turn OFF the main relay 52 and (ii) turn ON the sub relay 53.

However, as described above, the large current relay is ON and the small current relay is OFF at the starting point. Therefore, if the main relay 52 is the small current relay and the sub relay 53 is the large current relay, substantially nothing is performed in step S15.

On the other hand, if the main relay 52 is the large current relay and the sub relay 53 is the small current relay, the main relay 52 switches from ON to OFF and the sub relay 53 switches from OFF to ON in step S15. At this time, the power supply line 63 is supplied with power from the sub battery 2 via the sub relay 53, which is the small current relay. The important load 83 operates in the power saving mode, and therefore power supply via the small current relay is sufficient for the important load 83 to operate.

Considering maintaining power supply to the important load 83 and addressing the occurred abnormality, it is desirable that such switching of the main relay 52 and switching of the sub relay 53 are performed at the same time. However, in reality, considering the time required to transmit and receive the control signals R2 and R3 and switch the main relay 52 and the sub relay 53, it may be impossible to realize such concurrent switching.

In such a case, it is desirable that further determination is performed in step S15 to determine the order of the above-described processing (i) and (ii). Specifically, if the abnormality determined to have occurred is a ground fault, priority is given to swiftly blocking an excess current resulting from the ground fault, and thus processing (i) is performed prior to processing (ii). If the abnormality determined to have occurred is a voltage drop, it is unnecessary to block an excess current resulting from the ground fault, and thus processing (ii) is performed prior to processing (i) so that the period of the voltage drop in the power supply to the important load 83 can be reduced.

If the abnormality is an abnormality that occurred on the sub battery 2 side, processing in step S16 is executed. Specifically, the ECU 41 controls the control signals R2 and R3 to execute processing to (iii) turn OFF the sub relay 53 and (iv) turn ON the main relay 52.

Converse to step S15, if the main relay 52 is the large current relay and the sub relay 53 is the small current relay, substantially nothing is performed in step S16.

On the other hand, if the main relay 52 is the small current relay and the sub relay 53 is the large current relay, the main relay 52 switches from OFF to ON and the sub relay 53 switches from ON to OFF in step S15.

Although it is desirable that such switching of the main relay 52 and the sub relay 53 are performed at the same time, it may be impossible to realize such concurrent switching.

In such a case, it is desirable that further determination is performed in step S16 to determine the order of the above-described processing (iii) and (iv). Specifically, if the abnormality determined to have occurred is a ground fault, priority is given to swiftly blocking an excess current resulting from the ground fault, and thus processing (iii) is performed prior to processing (iv). If the abnormality determined to have occurred is a voltage drop, it is unnecessary to block an excess current resulting from the ground fault, and thus processing (iv) is performed prior to processing (iii) so that the period of the voltage drop in the power supply to the important load 83 can be reduced.

Upon either step S15 or S16 being executed, step S17 is executed. Specifically, the ECU 41 determines whether or not the abnormality determined to have occurred in step S11 based on the signals B1 and B2 has been resolved. Such determination is also performed based on the signals B1 and B2.

If the abnormality has not been resolved, step S17 is repeated, and if the abnormality has been resolved, S18 is executed. If the abnormality is a ground fault, the abnormality is unlikely to be resolved. However, if the abnormality is a voltage drop, the abnormality is likely to be resolved through charging or the like. In step S18, the state at the starting point, i.e. a state in which the small current relay is OFF and the large current relay is ON, is restored, using the control signals R2 and R3 from the ECU 41.

If the main relay 52 is the small current relay, the sub relay 53 is the large current relay, and the abnormality is an abnormality that occurred on the main battery 1 side, substantially nothing is performed in step S18, as in step S15.

If the main relay 52 is the large current relay, the sub relay 53 is the small current relay, and the abnormality is an abnormality that occurred on the sub battery 2 side, substantially nothing is performed in step S18, as in step S16.

If the main relay 52 is the small current relay, the sub relay 53 is the large current relay, and the abnormality is an abnormality that occurred on the sub battery 2 side, the main relay 52 switches from ON to OFF, and the sub relay 53 switches from OFF to ON.

At this time, the abnormality has already been resolved. Therefore, considering the fact that concurrent switching is not performed, it is desirable that the main relay 52 switches from ON to OFF after the sub relay 53 has switched from OFF to ON, to maintain power supply to the important load 83.

If the main relay 52 is the large current relay, the sub relay 53 is the small current relay, and the abnormality is an abnormality that occurred on the main battery 1 side, the main relay 52 switches from OFF to ON, and the sub relay 53 switches from ON to OFF.

Considering the fact that concurrent switching is not performed, it is desirable that the sub relay 53 switches from ON to OFF after the main relay 52 has switched from OFF to ON, for the aforementioned reason.

As a result of step S18, power is supplied to the power supply line 63 via the large current relay. Therefore, the important load 83 employs the normal mode in step S19, and increases the processing capabilities of the important load 83. Specifically, the important load 83 employs the normal mode by cancelling the abnormality notification G issued by the ECU 41. From the viewpoint of processing performed in steps S13 and S19, the ECU 41 can be regarded as a control circuit that operates the important load 83 in the first mode or the second mode, using the abnormality notification G.

Upon step S19 being executed, return processing is performed next. The return processing is a well-known technology, and for example, processing may be started again from the starting point.

In this way, the main battery 1 and the sub battery 2 are respectively connected to the power supply lines 61 and 62, and the important load 83 that requires a redundant power supply is connected to the power supply line 63, and therefore, even if a ground fault or a voltage drop occurs in only one of the power supply lines 61 and 62, it is possible to maintain power supply from the power supply line 63 to the important load 83, even though the magnitude of the current that can be fed is small in some cases (the fulfillment of the first objective and the third objective).

Also, one of the main relay 52 and the sub relay 53 has a smaller current capacity than the other, and therefore it is possible to reduce volume and costs that are required to form the configuration of the relay module 5 (the fulfillment of the second objective).

Second Embodiment

As described above, the present embodiment describes a case in which the separation relay 51 is provided. Accordingly, the control signal R1 is employed.

Figure 5:
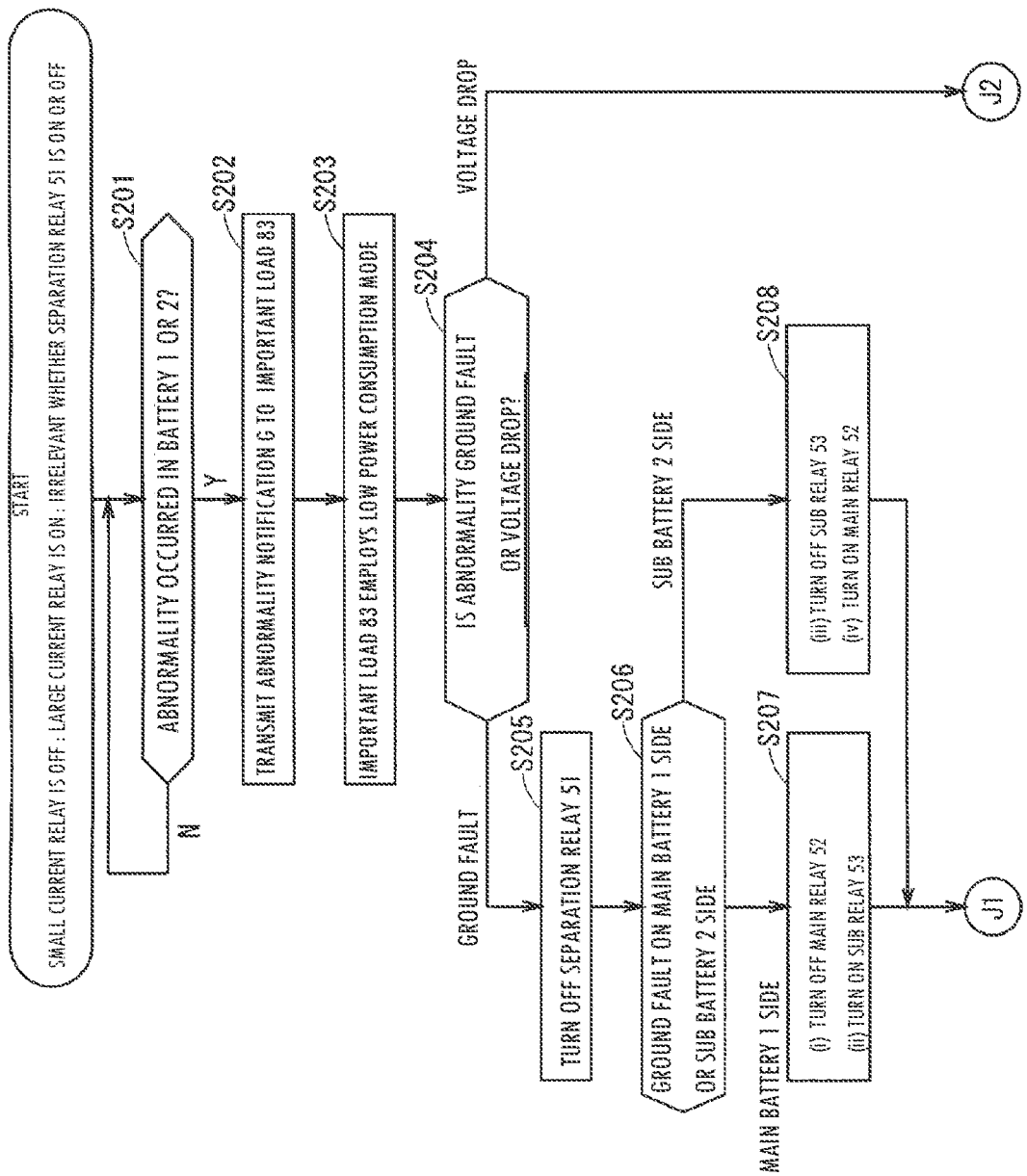
FIG. 5 is a flowchart showing operations of the power supply system according to the second embodiment, in conjunction with FIG. 6.
Figure 6:
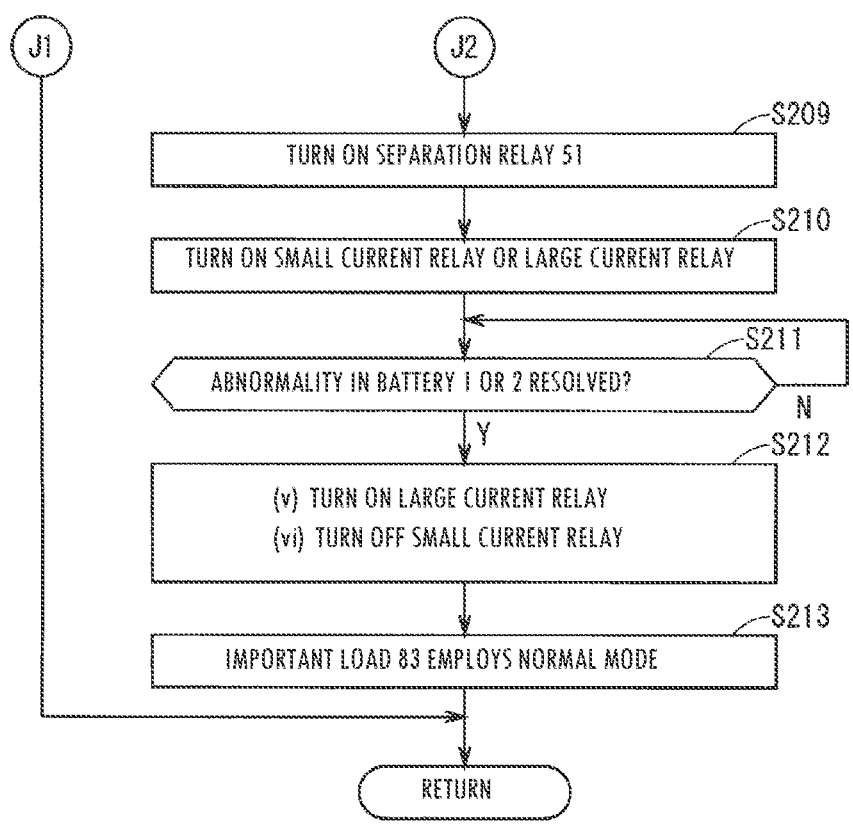
FIG. 6 is a flowchart showing operations of the power supply system according to the second embodiment, in conjunction with FIG. 5.

Both FIGS. 5 and 6 are flowcharts showing operations of the power supply system 100 according to the second embodiment. The flowchart in FIG. 5 and the flowchart in FIG. 6 are connected to each other at connectors J1 and J2.

First, when it is determined that there is no abnormality at the starting point, i.e., when default settings are employed, the large current relay is ON, and the small current relay is OFF, as in the first embodiment. Thus, power supply to the important load 83 is performed as usual, and the important load 83 can operate in the first mode. Therefore, in the following description, it is assumed that the important load 83 operates in the first mode at the starting point.

Note that, at the starting point, it does not matter whether the separation relay 51 is ON or OFF. If the separation relay 51 is ON, power can be supplied to any of the power supply lines 61, 62, and 63 via the large current relay, regardless of which of the main relay 52 and the sub relay 53 is the large current relay. With this configuration, power supply to the general loads 81 and 82 and the VS load 84 is performed using a current of a magnitude that is required to perform normal operations, which is advantageous from the viewpoint of improvements in energy efficiency and improvements in the response speed of each load.

Steps S201, S202, and S203 are the same as steps S11, S12, and S13 in the first embodiment, and therefore descriptions thereof are omitted.

Upon step S203 being executed, the ECU 41 determines, in step S204, whether the abnormality that has occurred is a ground fault or a voltage drop. The fact that such determination is performed based on the signals B1 and B2 has been described in the descriptions of steps S15 and S16 in the first embodiment, using step S11.

If the abnormality is a ground fault, the ECU 41 turns OFF the separation relay 51 in step S205, using the control signal R1. This operation is performed to isolate the power supply lines 61 and 62 from each other, and if the ground fault has occurred on one of the power supply line 61 side (in other words, the main battery 1 side) and the power supply line 62 side (in other words, the sub battery 2 side) with respect to the separation relay 51, the operation is performed to prevent the ground fault from having an influence on the other.

In contrast, if the abnormality is a voltage drop, step S209 (see FIG. 6) is executed via the connector J2. In step S209, the ECU 41 turns ON the separation relay 51, using the control signal R1. This operation is performed to, even if a voltage drop has occurred in one of the power supply lines 61 and 62, prevent the voltage applied to the important load 83 from dropping, using power supplied from the other via the power supply line 63. Considering the magnitude of the current flowing due to power supply at this time, it is desirable that the current capacity of the separation relay 51 is greater than or equal to the current capacity of the large current relay.

First, the case in which the abnormality that has occurred is a ground fault will be described with reference to FIG. 5 again. Upon step S205 being executed, the power supply system 100 can be controlled in the same manner as in the first embodiment, which is not provided with the separation relay 51. Specifically, upon step S205 being executed, steps S206, S207, and S208 are executed. Steps S206, S207, and S208 are respectively the same as steps S14, S15, and S16 in the first embodiment, and therefore descriptions thereof are omitted. That is, in the case where the abnormality that has occurred is a ground fault, the power supply system 100 according to the second embodiment operates to turn OFF the separation relay 51 prior to the switching of the main relay 52 and the switching of the sub relay 53, which are performed by the power supply system 100 according to the first embodiment depending on the position where the ground fault has occurred.

Upon step S207 or S208 being executed, return processing is performed next via the connector J1. This is because, after a ground fault has occurred, the ground fault is unlikely to be resolved. The return processing can also be performed in the same manner as the return processing in the first embodiment.

The following describes the case in which the abnormality determined to have occurred is a voltage drop with reference to FIG. 6. After step S209 has been executed, the power supply lines 61 and 62 are connected to each other by the separation relay 51, and power can be supplied to the power supply line 63 from both the main battery 1 and the sub battery 2. Therefore, regardless of in which of the power supply lines 61 and 62 the voltage drop has occurred, it is possible to supply power to the power supply line 63 by turning ON the small current relay or the large current relay (i.e. by turning ON the main relay 52 or the sub relay 53).

Therefore, step S210 in FIG. 6 shows processing that is performed to turn ON the small current relay or the large current relay. However, the large current relay is already ON at the starting point, and the large current relay can allow a normal current to flow, and therefore can allow a current that is smaller than the normal current to flow. From this viewpoint, processing in step S210 may be omitted.

Upon step S209 being executed, or upon step S210 being executed as well, steps S211, S212, and S213 are executed. These steps respectively correspond to steps S17, S18, and S19 in the first embodiment. Steps S211 and S213 are respectively the same as steps S17 and S19.

Since it is assumed that the abnormality is a voltage drop, step S212 is slightly different from step S18, and (v) processing that is performed to turn ON the large current relay and (vi) processing that is performed to turn OFF the small current relay are separately listed. That is, considering the fact that it is impossible to execute processing (v) and (vi) at the same time, it is desirable that processing (vi) is executed after processing (v).

Also, in step S212, the switching of the separation relay 51 is not performed, and the separation relay 51 was turned ON in step S209. Therefore, the separation relay 51 is kept ON in step S212. Maintaining the ON state is not an event resulting from the execution of step S212, and therefore, in the figure, this event is shown in parentheses as a note regarding step S212.

As described above, step S210 may be omitted, and if this is the case, the large current relay is ON and the small current relay is OFF as in the state at the starting point. Therefore, step S212 may be omitted as well as step S210.

In the second embodiment, upon step S207 or S208 being executed, step S211 may be executed in the same manner as in the first embodiment, without return processing being performed next.

As described above, the second embodiment also fulfills the first, second, and third objectives as with the first embodiment.

Modifications

The descriptions above illustrate an example in which the ECU 41 provided outside the relay module 5 outputs not only the abnormality notification G, but also the control signals R2 and R3 (and also the control signal R1) (see FIG. 2). The following modification shows a configuration in which an ECU provided outside the relay module 5 outputs the abnormality notification G, and an ECU provided inside the relay module 5 outputs the control signals R2 and R3 (and also the control signal R1).

Figure 7:
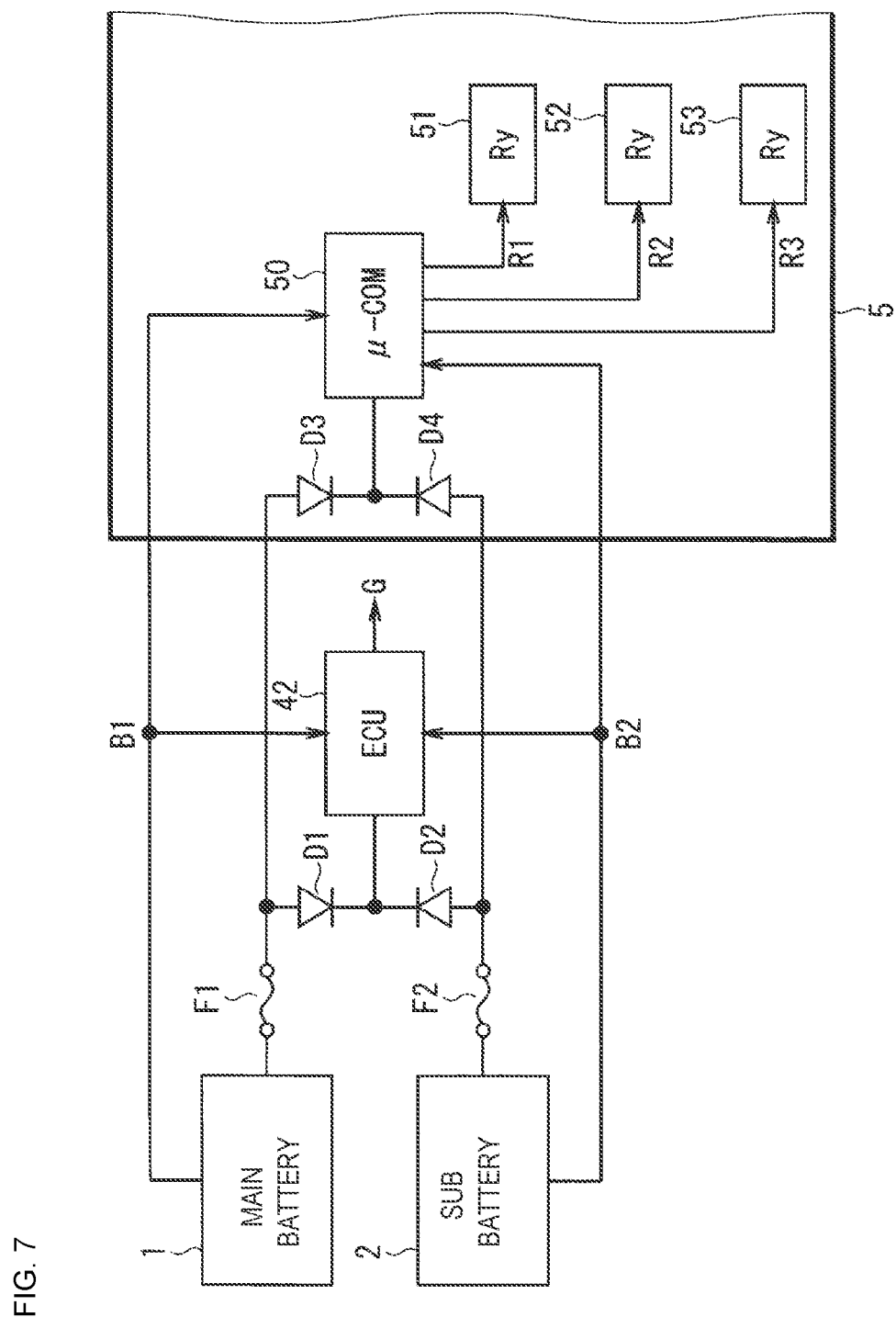
FIG. 7 is a block diagram showing a modified configuration.

FIG. 7 is a block diagram showing an example of a modified configuration, and as with the ECU 41, an ECU 42 is supplied with power from the main battery 1 and the sub battery 2 respectively via the diodes D1 and D2. The ECU 42 can also be realized using a BCM. The ECU 42 outputs the abnormality notification G if the signal B1 or B2 indicates an abnormality, and cancels the abnormality notification G if neither the signal B1 nor B2 indicates an abnormality. From such a viewpoint, it can be said that the ECU 42 is a control circuit, in the same meaning as with the ECU 41. Not only the relay module 5, but also such a control circuit may collectively be construed as a switch device. Alternatively, such a control circuit may be construed as being included in the power supply device 10 separately from the switch device.

The relay module 5 includes diodes D3 and D4, and a microcomputer (denoted as "μ-COM" in the FIG. 50. The cathodes of the diodes D3 and D4 are both connected to the power receiving terminal of the microcomputer 50. The fuse F1 is interposed between the main battery 1 and the anode of the diode D3, and the fuse F2 is interposed between the sub battery 2 and the anode of the diode D4.

In this modification, the signals B1 and B2 are also input to the microcomputer 50, and the microcomputer outputs the control signals R2 and R3 (and also the control signal R1). FIG. 7 shows an aspect that is provided with the separation relay 51, and in this aspect, the microcomputer 50 outputs the control signal R1 to the separation relay 51. Clearly, such a modification can also fulfill the first to third objectives as with the second embodiment.

Figure 8:
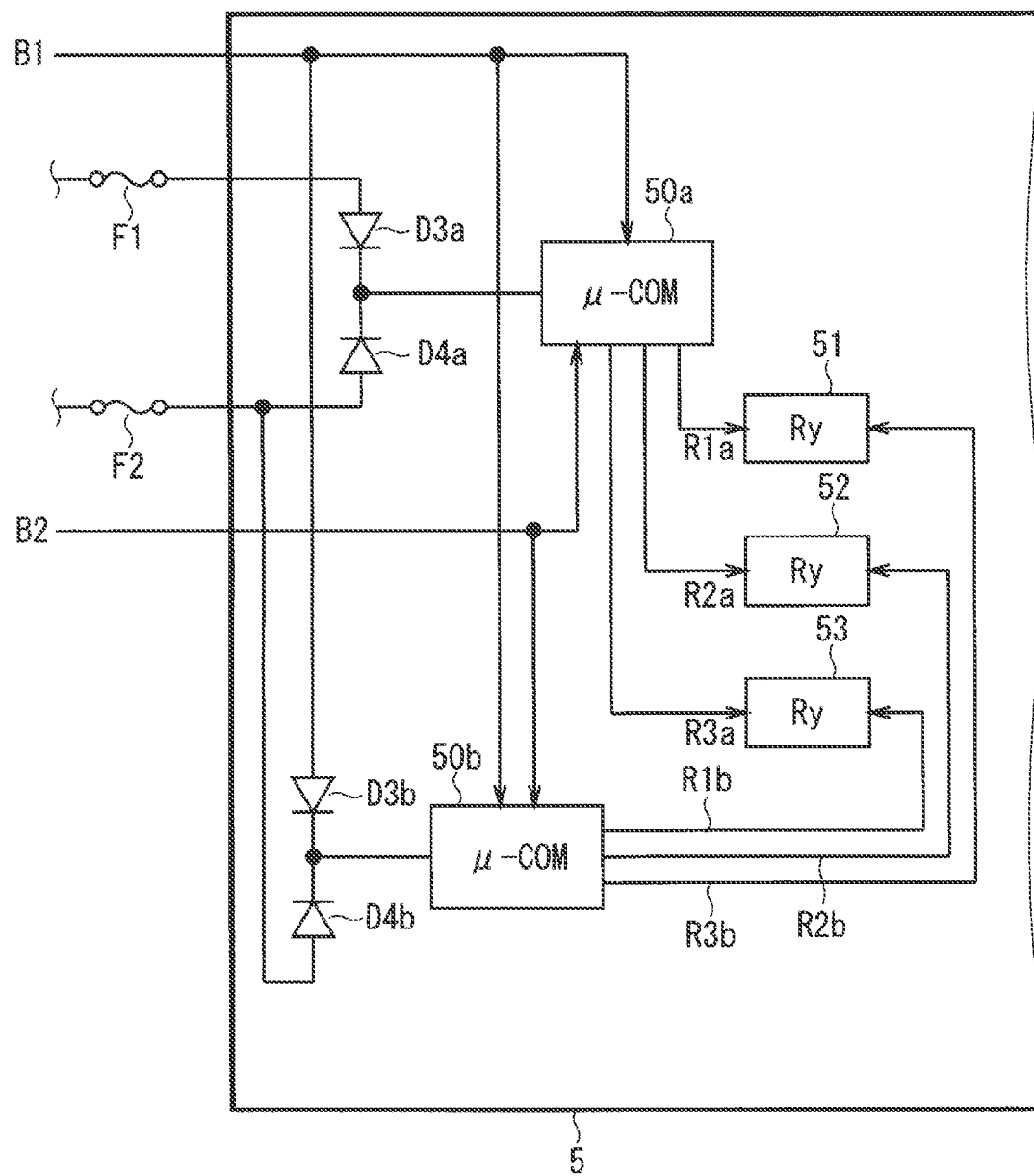
FIG. 8 is a block diagram showing a further modified configuration.
Figure 9:
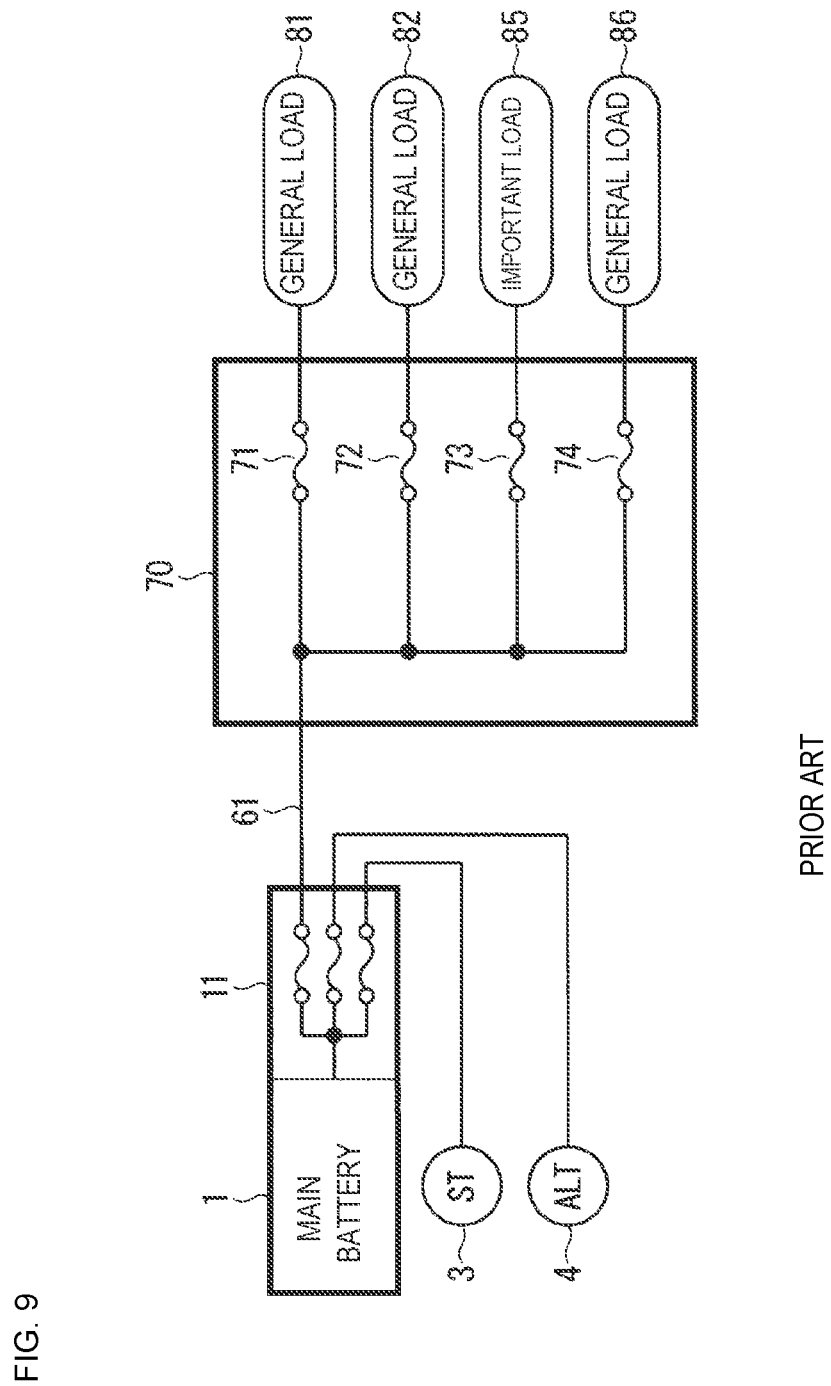
FIG. 9 is a block diagram showing an example of a conventional configuration of an on-board power supply system.

FIG. 8 is a block diagram showing an example of a further modified configuration, and this modification also employs the ECU 42 as in FIG. 7. However, the relay module 5 includes two microcomputers 50a and 50b and four diodes D3a, D3b, D4a, and D4b.

The microcomputer 50a and the diodes D3a and D4a are provided in the same connection relationship as the microcomputer 50 and the diodes D3 and D4 shown in FIG. 7. The microcomputer 50b and the diodes D3b and D4b are provided in the same connection relationship as the microcomputer 50 and the diodes D3 and D4 shown in FIG. 7.

The signals B1 and B2 are also input to the microcomputers 50a and 50b. Based on the signals B1 and B2, the microcomputer 50a outputs control signals R1a, R2a, and R3a that are equivalent to the control signals R1, R2, and R3, and the microcomputer 50b outputs control signals R1b, R2b, and R3b that are equivalent to the control signals R1, R2, and R3.

The control signals R1a and R1b are transmitted to the separation relay 51, the control signals R2a and R2b are transmitted to the main relay 52, and the control signals R3a and R3b are transmitted to the sub relay 53.

Even if the microcomputer 50a stops operating and does not transmit the control signal R1a, if the microcomputer 50b operates and transmits the control signal R1b, the separation relay 51 can operate as described in the second embodiment. Similarly, even if the control signals R2a and R3a are not transmitted, if the control signals R2b and R3b are transmitted, the main relay 52 and the sub relay 53 can operate as described in the first embodiment and the second embodiment. The same applies to the case in which the microcomputer 50b stops operating and the microcomputer 50a operates.

From such a viewpoint, the logical disjunction of the control signals R1a and R1b may be applied to the separation relay 51 instead of the control signal R1. The same applies to the control signals R2a and R2b and the control signals R3a and R3b. Thus, it is possible to provide the control circuit with redundancy.

Alternatively, the logical conjunction of the control signals R1a and R1b may be applied to the separation relay 51 instead of the control signal R1. The same applies to the control signals R2a and R2b and the control signals R3a and R3b. With such a configuration, even if there is a runaway process in one of the microcomputers 50a and 50b, the other can restore the default states of the separation relay 51, the main relay 52, and the sub relay 53.

Alternatively, the microcomputer 50a may send an inquiry to the microcomputer 50b, and check a response to the inquiry received from the microcomputer 50b. If there is no response, the microcomputer 50a stops the microcomputer 50b from operating, and vice versa.

As a matter of course, both of the two modifications above can achieve the same effects as the first embodiment even if the separation relay 51 is omitted and the control signal R1 (or the control signal R1a or R1b) is not employed.

Note that the configurations described in the embodiments and modifications above may be combined as appropriate as long as there are no inconsistencies with each other.

Although the present description has been described above in detail, the descriptions above are illustrative in all respects, and the present description is not limited to the descriptions. It should be understood that numerous modifications that are not illustrated can be conceived without departing from the scope of the present description.

LIST OF REFERENCE NUMERALS

1: Main Battery (First Power Storage Device)
2: Sub Battery (Second Power Storage Device)
5: Relay Module (Switch Device)
10: Power Supply Device
41, 42: ECU
51: Separation Relay (Third Switch)
52: Main Relay (First Switch)
53: Sub Relay (Second Switch)
61: Power Supply Line (First Power Supply Line)
62: Power Supply Line (Second Power Supply Line)
63: Power Supply Line (Third Power Supply Line)

The invention claimed is:

1. An on-board power supply switch device that is to be interposed between: a set of a first power storage device and a second power storage device that are both mounted on a vehicle; and a load that is mounted on the vehicle and that can operate using power supplied from either of the first power storage device or the second power storage device, the on-board power supply switch device comprising:
  a first power supply line that is to be connected to the first power storage device;
  a second power supply line that is to be connected to the second power storage device;
  a third power supply line that is to be connected to the load;
  a first switch that is provided between the first power supply line and the third power supply line;
  a second switch that is provided between the second power supply line and the third power supply line, and is different from the first switch in current capacity; and
  a control circuit,
  wherein, when it is determined that an abnormality has occurred in the first power supply line, the first switch becomes electrically disconnected, and when it is determined that an abnormality has occurred in the second power supply line, the first switch becomes electrically connected,
  when it is determined that an abnormality has occurred in the second power supply line, the second switch becomes electrically disconnected, and when it is determined that an abnormality has occurred in the first power supply line, the second switch becomes electrically connected,
  when it is determined that no abnormality has occurred in either the first power supply line or the second power supply line, whichever one of the first switch and the second switch has a larger current capacity becomes electrically connected, and the other becomes electrically disconnected,
  the load operates in either a first mode, or a second mode in which power consumption is lower than that in the first mode,
  when it is determined that an abnormality has occurred in either the first power supply line or the second power supply line, the control circuit causes the load to operate in the second mode, and
  when it is determined that a voltage drop has been resolved in both the first power supply line and the second power supply line, the control circuit causes the load to operate in the first mode.

2. The on-board power supply switch device according to claim 1, wherein a current capacity of the second switch is larger than a current capacity of the first switch, and
  when it is determined that a ground fault has occurred in the second power supply line, the first switch becomes electrically connected after the second switch has become electrically disconnected.

3. The on-board power supply switch device according to claim 1, wherein a current capacity of the second switch is smaller than a current capacity of the first switch, and
  when it is determined that a ground fault has occurred in the first power supply line, the second switch becomes electrically connected after the first switch has become electrically disconnected.

4. An on-board power supply switch device that is to be interposed between: a set of a first power storage device and a second power storage device that are both mounted on a vehicle; and a load that is mounted on the vehicle and that can operate using power supplied from either of the first power storage device or the second power storage device, the on-board power supply switch device comprising:
  a first power supply line that is to be connected to the first power storage device; a second power supply line that is to be connected to the second power storage device; a third power supply line that is to be connected to the load;
  a first switch that is provided between the first power supply line and the third power supply line; and
  a second switch that is provided between the second power supply line and the third power supply line, and is different from the first switch in current capacity,
  wherein, when it is determined that an abnormality has occurred in the first power supply line, the first switch becomes electrically disconnected, and when it is determined that an abnormality has occurred in the second power supply line, the first switch becomes electrically connected,
  when it is determined that an abnormality has occurred in the second power supply line, the second switch becomes electrically disconnected, and when it is determined that an abnormality has occurred in the first power supply line, the second switch becomes electrically connected,
  when it is determined that no abnormality has occurred in either the first power supply line or the second power supply line, whichever one of the first switch and the second switch has a larger current capacity becomes electrically connected, and the other becomes electrically disconnected,
  a current capacity of the second switch is larger than a current capacity of the first switch, and
  when it is determined that a voltage drop has occurred in the second power supply line, the second switch becomes electrically disconnected after the first switch has become electrically connected.

5. The on-board power supply switch device according to claim 4, wherein, when it is determined that a voltage drop in the second power supply line has been resolved, the first switch becomes electrically disconnected after the second switch has become electrically connected.

6. The on-board power supply switch device according to claim 4, further comprising:
a control circuit,
wherein the load operates in either a first mode, or a second mode in which power
consumption is lower than that in the first mode, and when it is determined that an abnormality has occurred in either the first power supply line or the second power supply line, the control circuit causes the load to operate in the second mode.

7. The on-board power supply switch device according to claim 6, wherein, when
it is determined that a voltage drop has been resolved in both the first power supply line and
the second power supply line, the control circuit causes the load to operate in the first mode.

8. An on-board power supply device comprising:
the on-board power supply switch device according claim 4;
the first power storage device; and
the second power storage device.

9. An on-board power supply switch device that is to be interposed between: a set of a first power storage device and a second power storage device that are both mounted on a vehicle; and a load that is mounted on the vehicle and that can operate using power supplied from either of the first power storage device or the second power storage device, the on-board power supply switch device comprising:
a first power supply line that is to be connected to the first power storage device;
a second power supply line that is to be connected to the second power storage device;
a third power supply line that is to be connected to the load;
a first switch that is provided between the first power supply line and the third power supply line; and
a second switch that is provided between the second power supply line and the third power supply line, and is different from the first switch in current capacity,
wherein, when it is determined that an abnormality has occurred in the first power supply line, the first switch becomes electrically disconnected, and when it is determined that an abnormality has occurred in the second power supply line, the first switch becomes electrically connected,
when it is determined that an abnormality has occurred in the second power supply line, the second switch becomes electrically disconnected, and when it is determined that an abnormality has occurred in the first power supply line, the second switch becomes electrically connected,
when it is determined that no abnormality has occurred in either the first power supply line or the second power supply line, whichever one of the first switch and the second switch has a larger current capacity becomes electrically connected, and the other becomes electrically disconnected,
a current capacity of the second switch is smaller than a current capacity of the first switch, and when it is determined that a voltage drop has occurred in the first power supply line, the first switch becomes electrically disconnected after the second switch has become electrically connected.

10. The on-board power supply switch device according to claim 9, wherein, when it is determined that a voltage drop in the first power supply line has been resolved, the second switch becomes electrically disconnected after the first switch has become electrically connected.

11. The on-board power supply switch device according to claim 9, further comprising a control circuit, wherein the load operates in either a first mode, or a second mode in which power consumption is lower than that in the first mode, and
when it is determined that an abnormality has occurred in either the first power supply line or the second power supply line, the control circuit causes the load to operate in the second mode.

12. An on-board power supply device comprising:
the on-board power supply switch device according to claim 9;
the first power storage device; and
the second power storage device.

13. An on-board power supply switch device that is to be interposed between: a set of a first power storage device and a second power storage device that are both mounted on a vehicle; and a load that is mounted on the vehicle and that can operate using power supplied from either of the first power storage device or the second power storage device, the on-board power supply switch device comprising:
a first power supply line that is to be connected to the first power storage device;
a second power supply line that is to be connected to the second power storage device;
a third power supply line that is to be connected to the load;
a first switch that is provided between the first power supply line and the third power supply line;
a second switch that is provided between the second power supply line and the third power supply line, and is different from the first switch in current capacity; and
a third switch that is connected between the first power supply line and the second power supply line,
wherein, when it is determined that an abnormality has occurred in the first power supply line, the first switch becomes electrically disconnected, and when it is determined that an abnormality has occurred in the second power supply line, the first switch becomes electrically connected,
when it is determined that an abnormality has occurred in the second power supply line, the second switch becomes electrically disconnected, and when it is determined that an abnormality has occurred in the first power supply line, the second switch becomes electrically connected,
when it is determined that no abnormality has occurred in either the first power supply line or the second power supply line, whichever one of the first switch and the second switch has a larger current capacity becomes electrically connected, and the other becomes electrically disconnected, and
when it is determined that a ground fault has occurred in either the first power supply line or the second power supply line, the third switch becomes electrically disconnected, and when it is determined that a voltage drop has occurred in either the first power supply line or the second power supply line, the third switch becomes electrically connected.

14. The on-board power supply switch device according to claim 8,
wherein a current capacity of the second switch is larger than a current capacity of the first switch, and
when it is determined that a ground fault has occurred in the second power supply line, the second switch becomes electrically disconnected after the third switch has become electrically disconnected, and the first switch becomes electrically connected after the second switch has become electrically disconnected.

15. The on-board power supply switch device according to claim 8,
wherein a current capacity of the second switch is smaller than a current capacity of the first switch, and
when it is determined that a ground fault has occurred in the first power supply line, the first switch becomes electrically disconnected after the third switch has become electrically disconnected, and the second switch becomes electrically connected after the first switch has become electrically disconnected.

16. The on-board power supply switch device according to claim 13, further comprising a control circuit, wherein the load operates in either a first mode, or a second mode in which power consumption is lower than that in the first mode, and
when it is determined that an abnormality has occurred in either the first power supply line or the second power supply line, the control circuit causes the load to operate in the second mode.

17. An on-board power supply device comprising:
the on-board power supply switch device according to claim 13;
the first power storage device; and
the second power storage device.

* * * * *